United States Patent
Shannon et al.

(10) Patent No.: US 7,277,992 B2
(45) Date of Patent: Oct. 2, 2007

(54) CACHE EVICTION TECHNIQUE FOR REDUCING CACHE EVICTION TRAFFIC

(75) Inventors: Christopher J. Shannon, Hillsboro, OR (US); Mark Rowland, Beaverton, OR (US); Ganapati Srinivasa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 380 days.

(21) Appl. No.: 11/087,916

(22) Filed: Mar. 22, 2005

(65) Prior Publication Data

US 2006/0218352 A1    Sep. 28, 2006

(51) Int. Cl.
*G06F 12/00*    (2006.01)

(52) U.S. Cl. .................. 711/141; 711/119; 711/122; 711/133; 711/134; 711/144; 711/145

(58) Field of Classification Search .............. 711/119, 711/122, 133, 134, 141, 144, 145
See application file for complete search history.

(56) References Cited

U.S. PATENT DOCUMENTS

| | | | |
|---|---|---|---|
| 5,584,013 A * | 12/1996 | Cheong et al. ............. 711/122 |
| 6,195,729 B1 * | 2/2001 | Arimilli et al. ............. 711/119 |
| 6,601,143 B1 * | 7/2003 | Lamparter .................. 711/134 |
| 2006/0155934 A1 * | 7/2006 | Rajamony et al. .......... 711/134 |

* cited by examiner

*Primary Examiner*—Jack Lane
(74) *Attorney, Agent, or Firm*—Philip A. Pedigo

(57) ABSTRACT

A technique for intelligently evicting cache lines within an inclusive cache architecture. More particularly, embodiments of the invention relate to a technique to evict cache lines within an inclusive cache hierarchy based on the cache coherency traffic generated between an upper level cache and lower level caches.

30 Claims, 6 Drawing Sheets

| STATE | # OF CORES WITH DATA |
|---|---|
| M | 1 |
| E | 1 |
| S | 1 |
| S | 2 |
| I | 0 |
| MI | 0 |
| MS | 1 |
| MS | 2 |
| ES | 1 |
| ES | 2 |

| STATE | # OF CORES WITH DATA |
|---|---|
| M | 1 |
| E | 1 |
| S | 1 |
| S | 2 |
| I | 0 |
| MI | 0 |
| MS | 1 |
| MS | 2 |
| ES | 1 |
| ES | 2 |

FIG. 5

| 4 WAY LRU | VICTIMS |
|---|---|
| 000 | 0,2 |
| 001 | 0,3 |
| 010 | 1,2 |
| 011 | 1,3 |
| 100 | 2,0 |
| 101 | 3,0 |
| 110 | 2,1 |
| 111 | 3,1 |

CACHE EVICTION TECHNIQUE FOR REDUCING CACHE EVICTION TRAFFIC

FIELD

Embodiments of the invention relate to microprocessors and microprocessor systems. More particularly, embodiments of the invention relate to caching techniques of inclusive cache hierarchies within microprocessors and computer systems.

BACKGROUND

Prior art cache line replacement algorithms typically do not take into account the effect of an eviction of a cache line in one level of cache upon a corresponding cache line in another level of cache in a cache hierarchy. In inclusive cache systems containing multiple levels of cache within a cohesive cache hierarchy, however, a cache line evicted in an upper level cache, for example, can cause the corresponding cache line within a lower level cache to become invalidated or evicted, thereby causing a processor or processors using the evicted lower level cache line to incur performance penalties.

Inclusive cache hierarchies typically involve those containing at least two levels of cache memory, wherein one of the cache memories (i.e. "lower level" cache memory) includes a subset of data contained in another cache memory (i.e. "upper level" cache memory). Inclusive cache hierarchies are useful in microprocessor and computer system architectures, as they allow a smaller cache having a relatively fast access speed to contain frequently used data and a larger cache having a relatively slower access speed than the smaller cache to store less-frequently used data. Inclusive cache hierarchies attempt to balance the competing constraints of performance, power, and die size by using smaller caches for more frequently used data and larger caches for less frequently used data.

Because inclusive cache hierarchies store at least some common data, evictions of cache lines in one level of cache may necessitate the corresponding eviction of the line in another level of cache in order to maintain cache coherency between the upper level and lower level caches. Furthermore, typical caching techniques use state data to indicate the accessibility and/or validity of cache lines. One such set of state data includes information to indicate whether the data in a particular cache line is modified ("M"), exclusively owned ("E"), able to be shared among various agents ("S"), and/or invalid ("I") ("MESI" states).

Efficient cache operation utilizes cache management techniques for replacing cache locations in the event of a cache miss. In a typical cache miss, the address and data fetched from the system or main memory is stored in cache memory. However, the cache needs to determine which cache location is to be replaced by the new address and data from system memory. One technique for replacing cache locations is implementing a protocol with least recently used (LRU) bits. Least recently used bits are stored for each cache location and are updated when the cache location is accessed or replaced. Valid bits determine the coherency status of the respective cache location. Therefore, based on the value of the least recently used bits and the valid bits, the cache effectively replaces the cache locations where the least recently used bits indicate the line is the least recently used or the line is not valid. There is a variety of replacement protocols utilized by cache memory, such as, pseudo-LRU, random, and not recently used (NRU) protocols. However, the present replacement protocols may result in increased inter-cache traffic. For example, replacing a line from an inclusive last level cache requires the same line to be evicted from all the lower level caches. Therefore, this results in increased inter-cache traffic.

Inter-cache traffic due to cache line evictions in upper level caches can be exacerbated in multi-core processors or multi-processor computer systems, in which multiple processing elements (cores or processors) share the same inclusive cache. FIG. 1 illustrates a typical prior art 2-level cache hierarchy, in which two lower level caches, such as level-1 ("L1") caches corresponding to two processor cores, respectively, contains a subset of data stored in an upper level cache, such as a level-2 ("L2") cache. Each line of each L1 cache of FIG. 1 typically contains MESI state data to indicate to requesting agents the availability/validity of data within a cache line. Cache data and MESI state information is maintained between the L1 caches and L2 cache via coherency information between the cache levels. FIG. 1 further illustrates an LRU replacement hierarchy to determine which cache way is to be replaced. In the prior art example of FIG. 1, the LRU chooses which way of the L2 cache to evict without regard to the traffic the coherency traffic the eviction may cause between the L2 cache and lower level caches, such as the L1 caches.

Accordingly, cache line eviction techniques that do not take into account the effect of a cache line eviction on traffic among lower level cache structures within the cache hierarchy can cause a processor or processors having access to the lower level cache to incur performance penalties.

BRIEF DESCRIPTION OF THE DRAWINGS

Embodiments of the invention are illustrated by way of example and not limitation in the figures of the accompanying drawings, in which like references indicate similar elements and in which:

FIG. 5 is a table illustrating cache line states and corresponding allowed core evictions, according to one embodiment.

FIG. 6 is a table of the next two victims for a plurality of LRU states of a cache line as utilized by a first embodiment.

DETAILED DESCRIPTION

Embodiments of the invention relate to caching architectures within computer systems. More particularly, embodiments of the invention relate to a technique to evict cache lines within an inclusive cache hierarchy based on the coherency traffic among other cache levels within the cache hierarchy.

Performance can be improved in computer systems and processors having an inclusive cache hierarchy, in at least some embodiments of the invention, by taking into consideration the effect of a cache line eviction within an upper level cache line on the corresponding cache line in a lower level cache or caches. Particularly, embodiments of the invention take into account the number of lower-level cache line evictions that may possibly will occur as a result of a cache line eviction from a corresponding shared upper-level cache.

Figure 1:
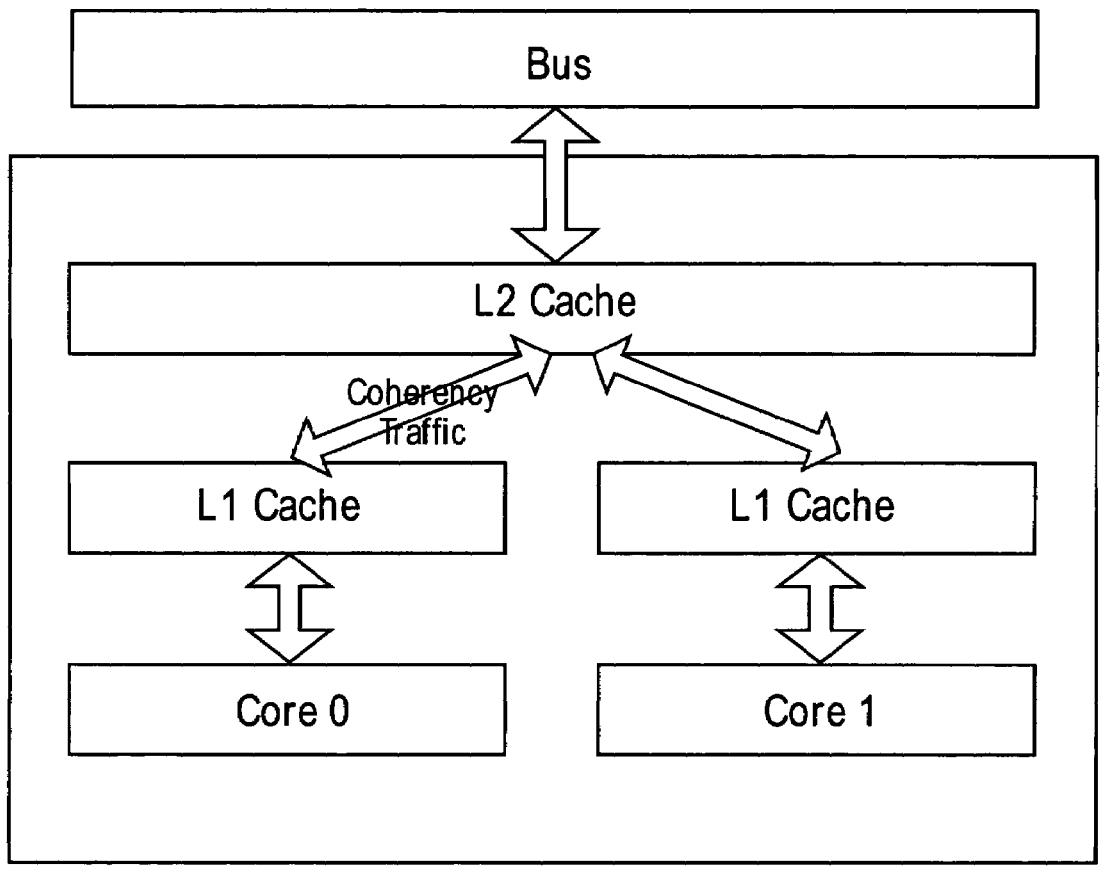
FIG. 1 is a prior art cache hierarchy in which cache eviction in an upper level cache is done irrespective of the number of corresponding lower level cache line evictions.
Figure 2:
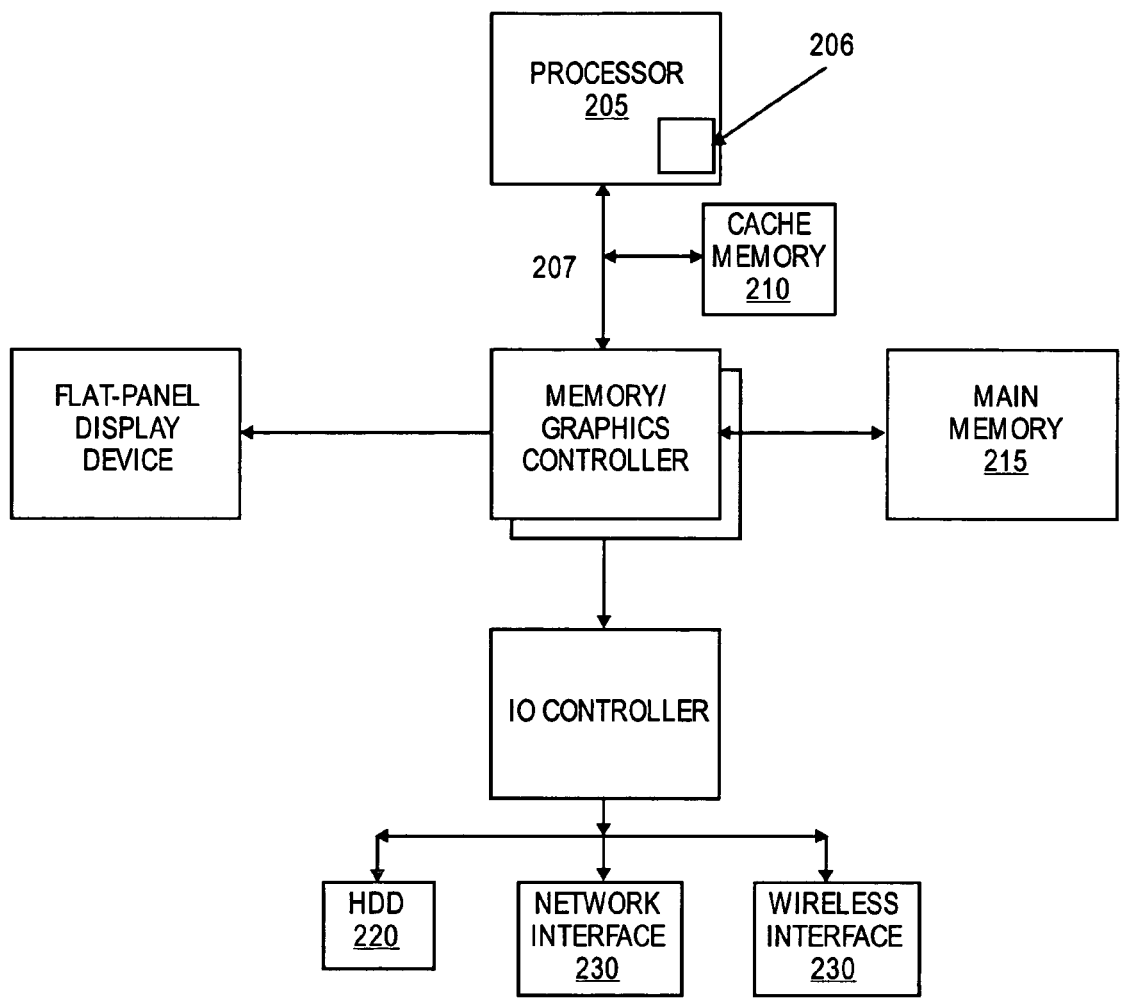
FIG. 2 is a front-side-bus (FSB) computer system in which one embodiment of the invention may be used.

FIG. 2 illustrates a front-side-bus (FSB) computer system in which one embodiment of the invention may be used. A processor 205 accesses data from a level one (L1) cache memory 210 and main memory 215. In other embodiments of the invention, the cache memory may be a level two (L2) cache or other memory within a computer system memory hierarchy. Furthermore, in some embodiments, the computer system of FIG. 2 may contain both a L1 cache and an L2 cache, which comprise an inclusive cache hierarchy in which coherency data is shared between the L1 and L2 caches.

Illustrated within the processor of FIG. 2 is one embodiment of the invention 206. Other embodiments of the invention, however, may be implemented within other devices within the system, such as a separate bus agent, or distributed throughout the system in hardware, software, or some combination thereof.

The main memory may be implemented in various memory sources, such as dynamic random-access memory (DRAM), a hard disk drive (HDD) 220, or a memory source located remotely from the computer system via network interface 230 containing various storage devices and technologies. The cache memory may be located either within the processor or in close proximity to the processor, such as on the processor's local bus 207. Furthermore, the cache memory may contain relatively fast memory cells, such as a six-transistor (6T) cell, or other memory cell of approximately equal or faster access speed.

The computer system of FIG. 2 may be a point-to-point (PtP) network of bus agents, such as microprocessors, that communicate via bus signals dedicated to each agent on the PtP network. Within, or at least associated with, each bus agent is at least one embodiment of invention 206, such that store operations can be facilitated in an expeditious manner between the bus agents.

Figure 3:
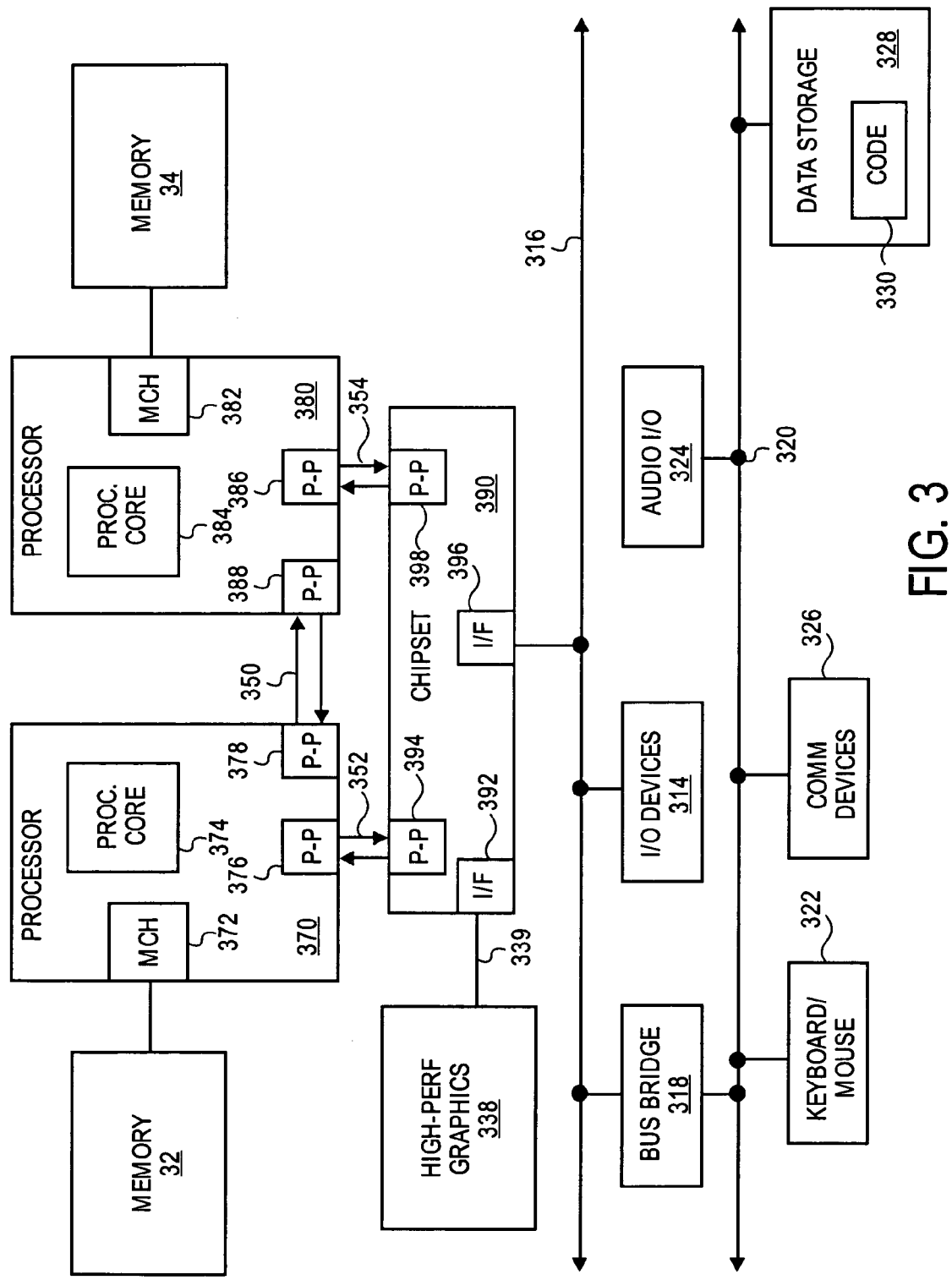
FIG. 3 is a point-to-point (PtP) computer system in which one embodiment of the invention may be used.

FIG. 3 illustrates a computer system that is arranged in a point-to-point (PtP) configuration. In particular, FIG. 3 shows a system where processors, memory, and input/output devices are interconnected by a number of point-to-point interfaces.

The system of FIG. 3 may also include several processors, of which only two, processors 370, 380 are shown for clarity. Processors 370, 380 may each include a local memory controller hub (MCH) 372, 382 to connect with memory 22, 24. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339.

At least one embodiment of the invention may be located within the PtP interface circuits within each of the PtP bus agents of FIG. 3. Other embodiments of the invention, however, may exist in other circuits, logic units, or devices within the system of FIG. 3. Furthermore, other embodiments of the invention may be distributed throughout several circuits, logic units, or devices illustrated in FIG. 3.

Figure 4:
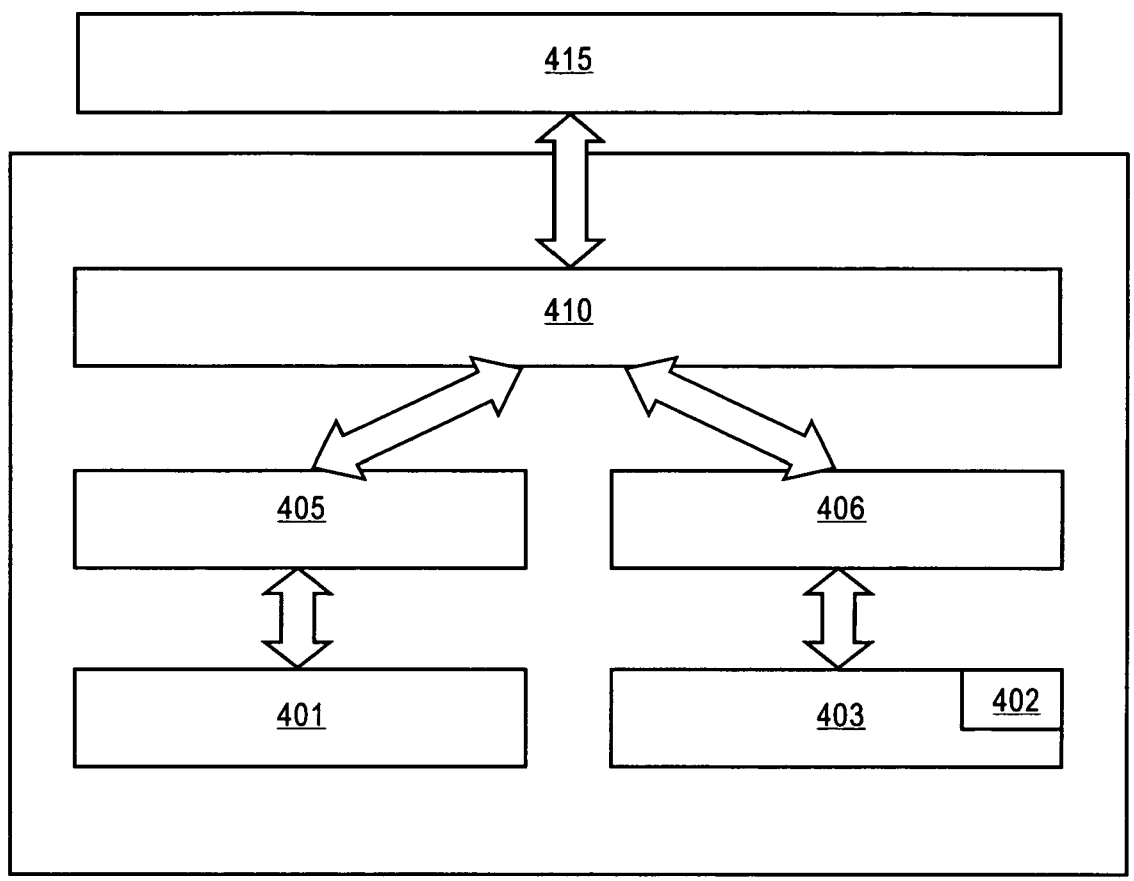
FIG. 4 is a multi-core microprocessor in which one embodiment of the invention may be used.

FIG. 4 illustrates a dual core processor in which one embodiment of the invention may be used. Particularly, each core 401 403 of the processor of FIG. 4 has associated with it an L1 cache 405 406. However, both cores and their associated L1 caches correspond to the same L2 cache 410. However, in other embodiments, each L1 cache may correspond to a separate L2 cache. Coherency information 408 is exchanged between each L1 cache and the L2 cache in order to update data and state information between the two layers of caches, such that the cores can access more frequently used data from their respective L1 caches and less frequently used data from the L2 cache without having to resort to accessing this data from alternative slower memory sources residing on the bus 415.

The eviction of a line may result in a different number of lower level cache evictions. The coherency traffic required to invalidate each lower level cache can be quite large, and can temporarily prevent other useful work from flowing through the system. In one embodiment, an indication of the amount of coherency traffic required for a given cache line can be readily available in some cache's tags via a series of "core bits". For example, there may be one corebit for each core that shares the cache, which indicates which cores potentially have a copy of this cache line.

FIG. 5 shows the possible cache states with the associated corebit information, according to one embodiment. Note that not all combinations of cache states and corebit information need to be supported by the cache. For example, the cache corresponding to the table of FIG. 5 supports a line in an M state having zero, one, or two cores sharing that data, but only allows one core to share E state data. In othe embodiments, other caches may support a different number of cores sharing the data for each cache line state.

In order to select the ways of an inclusive cache that may be evicted, in one embodiment of the invention, a replacement protocol, such as a least-recently used (LRU) way replacement protocol may be used. In one embodiment of the invention, indicates two among four cache ways be evicted using a three bit code. In other embodiments the LRU or other way replacment protocol may choose a different number of ways among a different number ways to replace.

FIG. 6 is a table of the candidates for the next two victims for a plurality of LRU states of a cache line as utilized by an embodiment. In this embodiment, a four way pseudo LRU replacement protocol is utilized with three bits for each set. For example, each bit is a node in a binary tree that points to the next victim. Consequently, all paths leading to the chosen way are inverted for pointing to the next victim to the other side of the tree. Therefore, in one aspect, the table depicts the next two victims for each possible LRU state.

Figure 7:
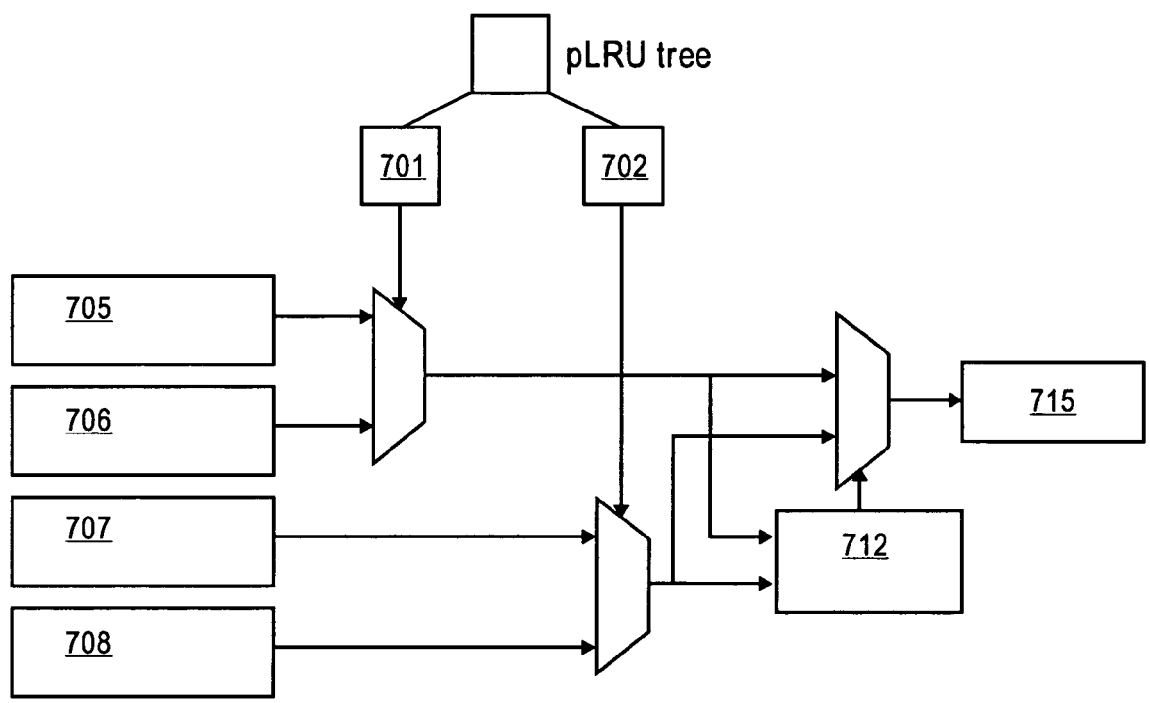
FIG. 7 is a diagram of a cache line eviction logic architecture according to one embodiment of the invention.

FIG. 7 illustrates a logic architecture that may be used to implement at least one embodiment of the invention. The two leaf nodes 701 and 702 in this example choose two ways among ways 705, 706, 707, and 708. These two ways are then fed into a multiplexer controlled by comparator 712. The comparator takes the core bits information of each way selected by the LRU hierarchy as inputs and chooses the way as the victim 715 with the least number of core bits set. In another embodiment, LRU bits not corresponding to a leaf could be used to choose the victim when there is a tie between two or more ways.

Throughout the examples illustrated herein, the inclusive cache hierarchy is composed of two levels of cache containing a single L1 cache and L2 cache, respectively. However, in other embodiments, the cache hierarchy may include more levels of cache and/or more L1 cache and/or L2 cache structures in each level.

Embodiments of the invention described herein may be implemented with circuits using complementary metal-oxide-semiconductor devices, or "hardware", or using a set of instructions stored in a medium that when executed by a machine, such as a processor, perform operations associated with embodiments of the invention, or "software". Alternatively, embodiments of the invention may be implemented using a combination of hardware and software.

While the invention has been described with reference to illustrative embodiments, this description is not intended to be construed in a limiting sense. Various modifications of the illustrative embodiments, as well as other embodiments, which are apparent to persons skilled in the art to which the invention pertains are deemed to lie within the spirit and scope of the invention.

What is claimed is:

1. An apparatus comprising:
    an upper level cache having an upper level cache line;
    at least two lower level caches each having a lower level cache line;
    an eviction unit to evict the upper level cache line depending only on a number of cache line evictions within the lower level caches that could possibly result from evicting the upper level cache line.

2. The apparatus of claim 1 wherein the upper level cache includes state information chosen from a group consisting of: modified, exclusive, shared, invalid.

3. The apparatus of claim 2 wherein the upper level cache comprises a level-2 (L2) cache.

4. The apparatus of claim 3 wherein the lower level cache comprises a level-1 (L1) cache.

5. The apparatus of claim 4 further comprising a processor core to access data from the L1 cache.

6. The apparatus of claim 3 wherein the lower level cache comprises a plurality of level-1 (L1) cache memories.

7. The apparatus of claim 6 further comprising a plurality of processor cores corresponding to the plurality of L1 cache memories.

8. A system comprising:
    a plurality of bus agents, at least one of the plurality of bus agents comprising an inclusive cache hierarchy including an upper level cache and a plurality of lower level caches, cache line evictions from the upper level cache are to be based only on the number of resulting lower level cache evictions that could possibly result from the upper level cache line evictions.

9. The system of claim 8 wherein the upper level cache lines comprise a state value chosen from a plurality of state values consisting of: modified invalidate, modified shared, and exclusive shared.

10. The system of claim 9 wherein the plurality of bus agents can access the upper level cache of the at least one of the plurality of bus agents.

11. The system of claim 10 wherein the at least one of the plurality of bus agents comprises a processor core to access the lower level cache.

12. The system of claim 11 wherein the plurality of lower level caches comprise at least one level-1 cache.

13. The system of claim 12 wherein the upper level cache comprises a level-2 cache.

14. The system of claim 13 wherein the upper level cache and the lower level caches are to exchange coherency information to maintain coherency between the upper level and lower level cache.

15. A method comprising:
    determining whether to evict an upper level cache line within an inclusive cache memory hierarchy based solely on the amount of resultant cache coherency traffic between the upper level cache and lower level caches;
    evicting the upper level cache line.

16. The method of claim 15 further comprising replacing the upper level cache line with more recently used data.

17. The method of claim 16 wherein the determining depends upon the cost to system performance of evicting the upper level cache line.

18. The method of claim 17 wherein evicting invalid upper level cache lines has no system performance cost.

19. The method of claim 18 wherein evicting an upper level cache line eviction results in a minimum number of lower level cache lines being evicted.

20. The method of claim 19 wherein the determination further depends upon whether the eviction of the upper level cache line will possibly cause corresponding lower level cache line to be evicted.

21. The method of claim 20 wherein the upper level cache comprises state variables chosen from a group consisting of: modified, exclusive, shared, and invalid.

22. The method of claim 21 wherein the upper level cache line is a level-2 cache line and the lower level cache line is a level-1 cache line.

23. An apparatus comprising:
    an upper level cache having an upper level cache line;
    a plurality of lower level caches having a plurality of lower level cache lines;
    an eviction means for evicting an upper level cache way depending on a number of lower level caches affected by the eviction of the upper level cache way.

24. The apparatus of claim 23 wherein the eviction means includes a comparator to compare a plurality of core bits corresponding to the plurality of lower level cache ways.

25. The apparatus of claim 24 wherein the upper level cache comprises a level-2 (L2) cache.

26. The apparatus of claim 25 wherein the lower level cache comprises a level-1 (L1) cache.

27. The apparatus of claim 26 wherein the eviction means further comprises a processor core to access data from the L1 cache.

28. The apparatus of claim 25 wherein the lower level cache comprises a plurality of level-1 (L1) cache memories.

29. The apparatus of claim 28 wherein the eviction means further comprises a plurality of processor cores corresponding to the plurality of L1 cache memories.

30. The apparatus of claim 23 wherein the eviction means comprises at least one instruction, which if executed by a machine causes the machine to perform a method comprising:
    determining whether to evict the upper level cache line based solely on a number of core bits corresponding to the upper level cache line;
    evicting the upper level cache line.

* * * * *